US009547636B2

(12) United States Patent
Nielsen et al.

(10) Patent No.: US 9,547,636 B2
(45) Date of Patent: *Jan. 17, 2017

(54) MOBILE DATA AND HANDWRITING SCREEN CAPTURE AND FORWARDING

(71) Applicant: Microsoft Technology Licensing, LLC, Redmond, WA (US)

(72) Inventors: Amdi A. Nielsen, Hedehusene (DK); Rolf Olsen, Slangerup (DK); Mette G. Munck, Vedbaek (DK); Christian Bøgh Jensen, Charlottenlund (DK); Kristian Torning, Cobenhavn (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/180,293

(22) Filed: Feb. 13, 2014

(65) Prior Publication Data

US 2014/0164889 A1 Jun. 12, 2014

Related U.S. Application Data

(63) Continuation of application No. 13/710,692, filed on Dec. 11, 2012, now Pat. No. 8,803,909, which is a continuation of application No. 11/562,014, filed on Nov. 21, 2006, now Pat. No. 8,330,773.

(51) Int. Cl.
| | | |
|---|---|---|
| *G06F 17/24* | (2006.01) | |
| *G06F 3/0483* | (2013.01) | |
| *G06F 3/0488* | (2013.01) | |
| *G06F 17/21* | (2006.01) | |
| *H04M 1/725* | (2006.01) | |

(52) U.S. Cl.
CPC .......... *G06F 17/241* (2013.01); *G06F 3/0483* (2013.01); *G06F 3/04883* (2013.01); *G06F 17/211* (2013.01); *H04M 1/72522* (2013.01)

(58) Field of Classification Search
None
See application file for complete search history.

(56) References Cited

U.S. PATENT DOCUMENTS

| | | | |
|---|---|---|---|
| 6,054,990 | A | 4/2000 | Tran et al. |
| 6,088,481 | A | 7/2000 | Okamoto et al. |
| 6,557,029 | B2 | 4/2003 | Szymansky |
| 6,763,373 | B2 | 7/2004 | Shiigi |
| 6,792,143 | B1 | 9/2004 | Harmovaara |
| 7,009,594 | B2 | 3/2006 | Wang et al. |
| 7,103,315 | B2 | 9/2006 | Wilkinson |

(Continued)

OTHER PUBLICATIONS

Goldstein, et al., "Providing Proper Affordances when Transferring Source Metaphors from Information Appliances to a 3G Mobile Multipurpose Handset," Published 2003 Springer-Verlag London Limited, 9 pages.

(Continued)

*Primary Examiner* — Maurice L McDowell, Jr.
(74) *Attorney, Agent, or Firm* — Thomas Marquis; Kate Drakos; Micky Minhas

(57) ABSTRACT

The claimed subject matter provides a system and/or a method that facilitates communicating data utilizing a portable device. An interface component can receive annotation data related to a display associated with a portable device. An annotation component can append a screen shot corresponding to the display with the annotated data to create an annotated screen shot.

20 Claims, 12 Drawing Sheets

(56) References Cited

U.S. PATENT DOCUMENTS

| | | |
|---|---|---|
| 8,330,773 B2 | 12/2012 | Nielsen et al. |
| 8,803,909 B2 | 8/2014 | Nielsen et al. |
| 2003/0001899 A1 | 1/2003 | Partanen et al. |
| 2004/0021681 A1 | 2/2004 | Liao |
| 2005/0188357 A1 | 8/2005 | Derks et al. |
| 2007/0004461 A1 | 1/2007 | Bathina et al. |
| 2008/0119235 A1 | 5/2008 | Nielsen et al. |

OTHER PUBLICATIONS

Monsondor, et al., "LiveMail: Personalized Avatars for Mobile Entertainment," 2006 Mobile Information Systems, vol. 2, No. 2-3, pp. 95-110.

Myers, et al., "Multimodal User Interface for Mobile Robots," 1998 11th Annual Symposium on User Interface Software and Technology, 4 pages.

MOBILE DATA AND HANDWRITING SCREEN CAPTURE AND FORWARDING

CROSS-REFERENCE TO RELATED APPLICATIONS

This application is a continuation of U.S. application Ser. No. 13/710,692, filed on Dec. 11, 2012, which is a continuation of U.S. patent application Ser. No. 11/562,014, filed on Nov. 21, 2006, now U.S. Pat. No. 8,330,773, issued on Dec. 11, 2012, entitled "MOBILE DATA AND HANDWRITING SCREEN CAPTURE AND FORWARDING," which are incorporated herein by reference in their entirety.

BACKGROUND

In the not too distant past, mobile communication devices in general, and mobile telephones in particular, were luxury items only affordable to those with substantial income. Furthermore, these mobile communication devices were significant in size, rendering them inconvenient for extended portability based at least in part upon size (e.g., battery, housing, circuitry, etc.). For example, in contrast to today's mobile telephones (and other mobile communication devices), mobile telephones of the recent past could not be placed into a user's pocket and/or handbag without causing extreme discomfort. In other words, the benefit of mobile communications was diminished due to the inconvenient characteristics associated with such former mobile communication devices.

The development, refinement, and advancements in mobile communications have rapidly increased to allow convenient and efficient mobile communications and/or mobile communication devices, wherein such above-described deficiencies have been overcome. Mobile communication devices have added functionality (e.g., game applications, web access, storage capacity, address books, display size, ergonomics, battery life, capture/display images, capture/display video, text message, etc.), while also decreased in size (e.g., housing, circuitry, battery, etc.). More importantly, the costs of such mobile communication devices and mobile communication services have decreased rapidly due to various technological advancements within the industry.

Furthermore, the development and refinement of mobile communication devices continues to occur at an extremely rapid pace. In particular, advancements in mobile communication devices are mostly based upon consumer demand. In order to fulfill consumer needs, the industry provides a plurality of devices (e.g., models of devices having various applications, and features). Smaller devices, game applications, web access, storage capacity, display size, cameras, media storage, MP3 capabilities, ergonomics, phonebook storage, longer battery life, are a few examples that encourage the mobile communication device industry to improve upon existing technology. Moreover, most mobile communication devices do not employ a graphics processing unit (GPU) and/or a graphic card on the desktop, yet in the near future the mobile communication device industry is moving toward such goal.

Thus, mobile devices are increasing in technological ability wherein mobile communication devices can provide a plurality of functionality within a limited device-space. Mobile communication devices can be, but not limited to, cell phones, portable digital assistants (PDA's), pagers, tablets, messenger devices, hand-helds, pocket translators, bar code scanners, smart phones, gaming devices, portable media devices, scanners, and the like. Although each device employs a specific function for a user, devices have been developing to allow overlapping functionality in order to appeal to consumer needs. In other words, mobile devices have incorporated a plurality of features and/or applications such that the devices have invaded one another's functionality. For example, cell phones can provide cellular service, phonebooks, calendars, games, voicemail, paging, web browsing, video capture, image capture, voice memos, voice recognition, etc.

As a result, portable devices have incorporated a variety of techniques and/or methods for inputting information in order to cater to the user and/or user needs. Portable devices facilitate entering information utilizing components such as, but not limited to, keyboards, keypads, touch pads, touchscreens, speakers, stylus' (e.g., wands), writing pads, etc. Based on such data entered and/or collected, portable devices manipulate and/or employ such data in a multitude of ways in order to convey such data and enhance the functionality and/or capability of the devices and respective features/applications. Such user-interaction and/or data communication is a crucial element upon providing portable devices to meet consumer demand.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate appending a screen shot associated with a portable device with annotated data. An annotation component can receive data and/or annotation data via an interface component, wherein such data can be appended to a screen shot associated with displayed data on a portable device. In other words, the annotation component provides the editing of displayed data with collected annotation data to facilitate conveying information and/or context. The annotation data can be, for instance, audio data, voice data, video data, live-stream data, graphical data, deletion of displayed data, handwriting data, typed data, and the like. Moreover, the annotation data can be any suitable data received via at least one of a microphone, a mouse, a stylus, a touchpad, a touch-screen, a microphone, a camera, a video camera, a digital camera, a tablet, an interactive screen, a display, etc.

In accordance with one aspect of the subject innovation, the annotation component can utilize a tools component that enables the collecting and/or tracking of various annotation data formats and/or types. The tools component can employ a multitude of options to collect and/or track annotation data associated with displayed data regardless of format. In general, the tools component can allow for the collection of annotation data such as, but not limited to, graphics, audio, video, voice, live-stream, and/or any combination thereof. In accordance with yet another aspect of the claimed subject matter, the annotation component can further utilize a screen capture component that can capture at least one screen shot related to displayed data on a portable device. The screen capture component can collect one or more screen shots (e.g., a collection of screen shots can be utilized for implementing video annotation, animation in the form of a slide show or similar, and/or live-stream annotation), wherein each screen shot includes annotations based at least in part upon tracked and/or captured data provided by a user and/or machine.

In accordance with still another aspect of the subject innovation, the annotation component can employ a communication component that facilitates transmitting the annotated screen shot to a disparate device. The disparate device can be any suitable device and/or entity that can receive data such as, but not limited to, a computer, a laptop, a machine, a disparate portable device, a network, a server, a web site, an email address, a hard drive, a hand-held, a mobile device, a cellular phone, a smart phone, a text messenger, a mini-computer, a portable digital assistant (PDA), a hand-held computing device, a satellite radio, a satellite device, a global positioning system (GPS), a GPS device, a gaming device, a portable media device, mobile communication device, and/or any other suitable entity and/or device that can display and/or receive data. In other aspects of the claimed subject matter, methods are provided that facilitates annotating a screen shot with user input data to create an annotated screen shot that enhances data communication.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
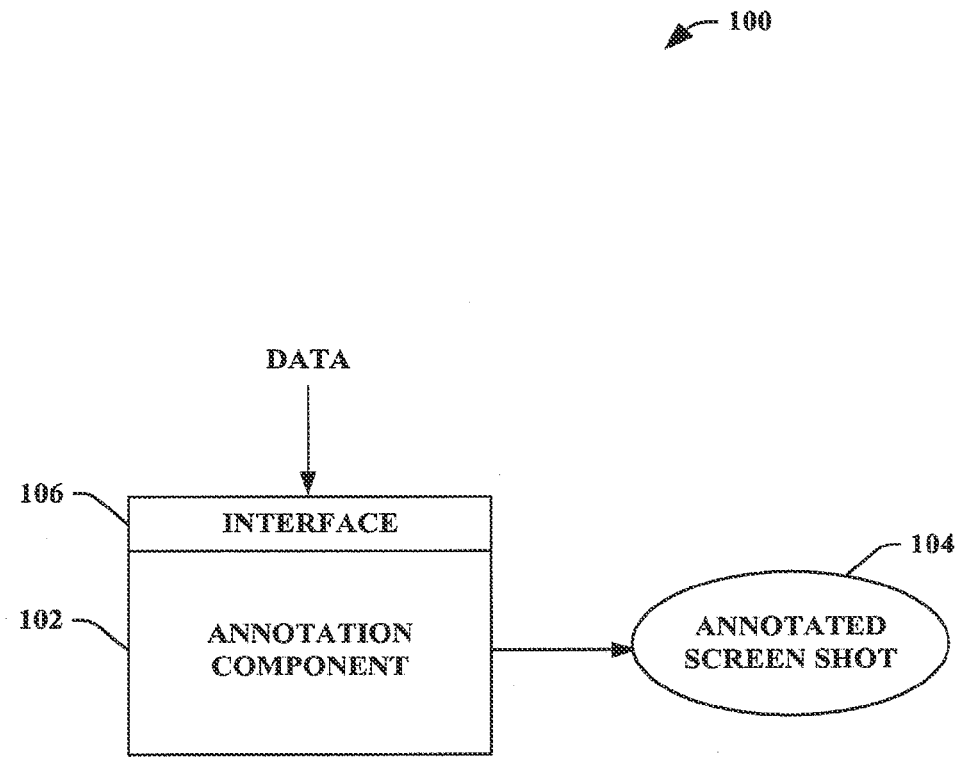
FIG. 1 illustrates a block diagram of an exemplary system that facilitates appending a screen shot associated with a portable device with annotated data.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates appending a screen shot associated with a portable device with annotated data. The system 100 can include an annotation component 102 that can receive data and/or annotation data via an interface component 106 (discussed supra and also referred to as interface 106), wherein the annotation component 102 can create an annotated screen shot 104 utilizing the received data and/or annotation data. In particular, the annotation component 102 can capture data associated with a display that corresponds to a portable device. It is to be appreciated that the captured data can be, but is not limited to, a graphic, a handwritten graphic, audio, video, a video, a deletion of content/data, and/or any combination thereof. Thus, the annotation component 102 allows captured data to be appended with disparate data associated with a display on any suitable portable device such as, but not limited to, a mobile device, a cellular phone, a smart phone, a text messenger, a hand-held device, a mini-computer, a portable digital assistant (PDA), a hand-held computing device, a satellite radio, a satellite device, a global positioning system (GPS), a GPS device, a gaming device, a portable media device, mobile communication device, and/or any suitable portable device that can display data.

Moreover, the annotation component 102 can be utilized with a portable device that employs a display for data. The display can illustrate specific data to a user and/or machine, wherein such data can be annotated and/or appended with additional data. In particular, if the display is depicting an image, the image can be annotated and/or edited with audio, video, and/or graphics to convey a particular detail. In other words, the annotation component 102 can capture the data displayed on the portable device as well as track and/or capture annotated and/or appended data provided by a user and/or machine. Data can be captured in one format but exported in many different formats. The annotation component 102 can also provide play back (e.g., handwriting live, video, etc.) for the annotation (described infra). Furthermore, it is to be appreciated that the annotation component 102 can receive any suitable drawing or other natural interaction handwriting or otherwise captured gestures that could be captured using for instance a stylus on a touch screen, a sensor tracking the movement of a light source, the reflections from an object being tracked, and/or any other similar manner in the sense of applying pressure to something with a pen (discussed in more detail below).

For instance, a portable digital assistant (PDA) can utilize a plurality of applications and further display data associated with such applications. Any data displayed on the PDA can be appended (e.g., utilizing the annotation component 102) to allow user customization to convey a particular thought and/or detail associated therewith. Thus, if a particular file is displayed, a screen shot of such file can be captured and annotated data can be tracked to allow the creation of an annotated screen shot 104. In another instance, the desktop of the PDA can be captured via a snap shot, wherein the desktop can be appended with captured annotation data such as audio, video, graphics, and/or any combination thereof. In other words, any data displayed on a portable device can be annotated with the annotation component 102 by capturing a screen shot and appending such screen shot with annotation data (e.g., voice, audio, video, handwriting, graphics, characters, symbols, etc.) to create the annotated screen shot 104.

In one particular example, a mobile communication device can include a camera, wherein an image of a person can be taken. The annotation component 102 can allow the addition of graphics (e.g., handwritten and/or typed such as symbols, characters, graphics, etc.), a deletion of content/data (e.g., erasing a portion of displayed data, etc.), audio (e.g., a message saying "hello," music, sound effects, etc.), video (e.g., a clip of graphics being drawn onto the screen shot, etc.), and/or any combination thereof (e.g., a graphic with audio, etc.). Upon such annotation, the annotated screen shot 104 can be communicated and/or transmitted to any other user and/or suitable device such as, but not limited to, a computer, a laptop, a machine, a portable device, a network, a server, a web site, an email address, a hard drive, a hand-held, a mobile device, a cellular phone, a smart phone, a text messenger, a mini-computer, a portable digital assistant (PDA), a hand-held computing device, a satellite radio, a satellite device, a global positioning system (GPS), a GPS device, a gaming device, a portable media device, mobile communication device, and/or any other suitable entity and/or device that can display and/or receive data.

In addition, the system 100 can include any suitable and/or necessary interface component 106 (herein referred to as "interface 106"), which provides various adapters, connectors, channels, communication paths, etc. to integrate the annotation component 102 into virtually any operating and/or database system(s) and/or with one another. In addition, the interface component 106 can provide various adapters, connectors, channels, communication paths, etc., that provide for interaction with the annotation component 102, annotated screen shot 104, and/or any other component, data and the like associated with the system 100.

Figure 2:
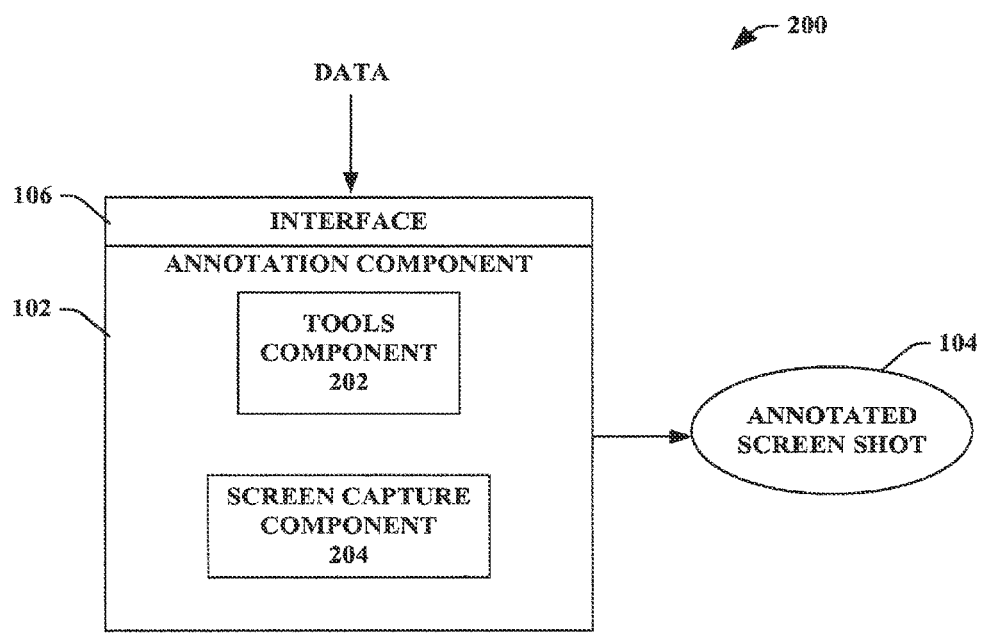
FIG. 2 illustrates a block diagram of an exemplary system that facilitates employing data capture to create an annotated screen shot related to a portable device.

FIG. 2 illustrates a system 200 that facilitates employing data capture to create an annotated screen shot related to a portable device. The system 200 can include the annotation component 102 that can create the annotated screen shot 104 by capturing a screen shot associated with displayed data and appending such screen shot with annotation data such as, but not limited to, audio, video, graphics, and/or any combination thereof. Moreover, it is to be appreciated that the annotation component 102 can allow the deletion of data to the displayed data in order to create the annotated screen shot 104. In general, the annotation component 102 can allow the addition of annotation data (e.g., and/or deletion of data) to any data displayed (e.g., application data, files, thumbnails, email, word processing documents, electronic files, images, pictures, video, audio clips, operating system data, any suitable data displayed on a portable device, a portion of a graphic, etc.).

The annotation component 102 can include a tools component 202 that facilitates capturing annotation data in a plurality of formats. The tools component 202 can provide a multitude of options to collect and/or track annotation data associated with displayed data regardless of format. In general, the tools component 202 can allow for the collection of annotation data such as, but not limited to, graphics, audio, video, voice, live-stream, and/or any combination thereof. For instance, the tools component 202 can allow the input of graphics that can be appended to displayed data. It is to be appreciated that the graphics can be handwritten, typed, and/or any combination thereof. Moreover, such graphics can be any suitable graphic such as a symbol, a character, a line, a shape, image, and the like of any suitable color, font, size, etc. For instance, a user can annotate displayed data such as a data file depicted names, wherein the annotation can be free-hand drawings and/or markings from a user in the color red to emphasize and/or highlight data such as the names within the data file.

In another instance, the tools component 202 can capture annotation data that relates to audio. The tools component 202 can collect audio annotation (e.g., annotation data) from at least one of a user and/or machine, wherein such audio can correlate to a particular screen shot and/or displayed data on a portable device. In other words, audio can be collected (e.g., from the user, surroundings, sound clips, etc.) that relates to displayed data on the portable device. For example, a voice from a user that describes an image displayed on the portable device can be collected, wherein the audio and image combined are the annotated screen shot 104.

In yet another example, the tools component 202 can capture annotation data associated with video and/or live-stream. For example, the annotation data collected by the tools component 202 can be a video and/or live-stream associated with the displayed data on the portable device. The video can include sound and/or displayed data in real-time or time-shifted (e.g., live-stream or recorded video respectively). Thus, a portable device can initiate an annotation data capture mode, wherein any following actions and/or data manipulations are tracked and/or collected. Upon the conclusion of collecting and/or tracking data, the combination of the displayed data and collected data can be the annotated screen shot(s) 104. In particular, it is to be appreciated that the live-stream annotation data can be employed and/or a video recording technique that time-shifts the video annotation data.

The annotation component 102 can further utilize a screen capture component 204 that provides the collection of at least one screen snap shot (e.g., screen shot) associated with a portable device, wherein such screen snap shot can include the annotation data appended. For example, the screen capture component 204 can collect one or more screen shots (e.g., a collection of screen shots can be utilized for implementing video annotation and/or live-stream annotation), wherein each screen shot includes annotations based at least in part upon tracked and/or captured data provided by a user and/or machine. In a specific example, the screen capture component 202 can be employed to allow the collection of the annotated screen shot 104 and/or in the case of video a plurality of annotated screen shots.

The system 200 can allow a user to add a personal drawing and/or handwriting on top of a current view and/or content of a screen and/or display of a portable device. In addition, the system 200 can allow a user to pass on the annotated screen shot (e.g., image, picture, etc.) 104 (e.g., having the screen contents and personal additions) utilizing at least one of mail, multimedia messaging service (MMS), and the like. For instance, if email is employed to transmit the annotated screen shot 104, additional information can be added in the email as the user is allowed to add text to an auto-composed or manually initiated email. The system 200 can further provide the any of the following functionalities: drawing on the screen, choosing color and/or line thickness, erasing, writing (e.g., utilizing handwriting recognition), etc.

Figure 3:
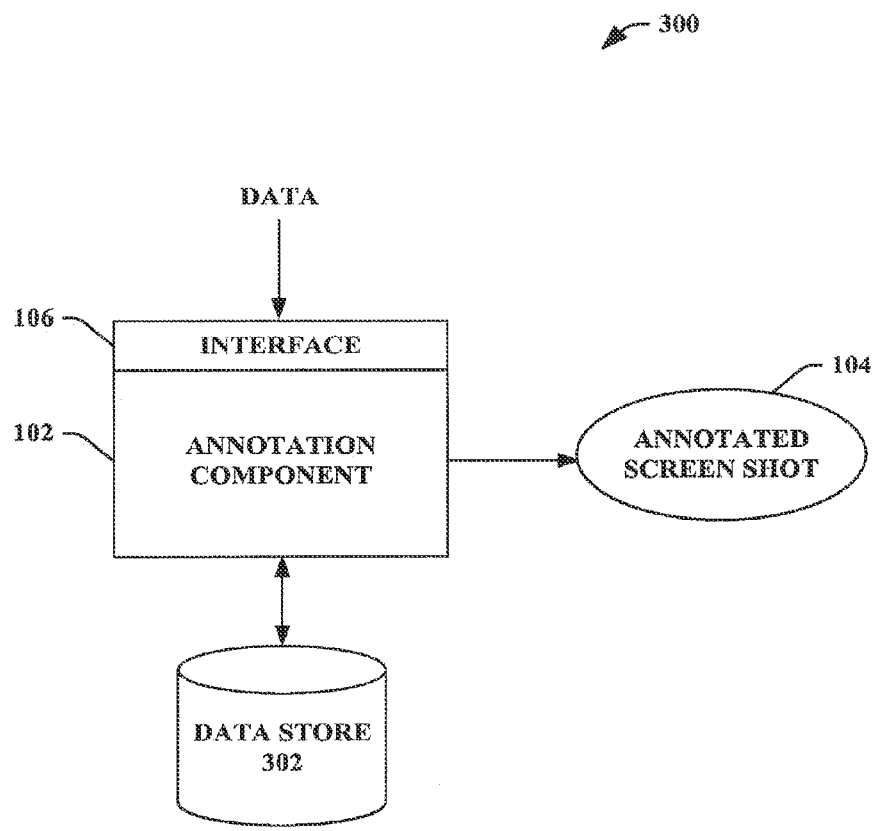
FIG. 3 illustrates a block diagram of an exemplary system that facilitates annotating a screen shot with user input data to create an annotated screen shot that enhances data communication.

FIG. 3 illustrates a system 300 that facilitates annotating a screen shot with user input data to create an annotated screen shot that enhances data communication. The annotation component 102 can incorporate and capture displayed data and corresponding annotation data to create an annotated screen shot 104 that conveys and/or expresses particulars associated with data. For example, the annotation data can be, but is not limited to, graphics, audio, video, live-stream, and/or any combination thereof. Moreover, the annotation component 102 can allow the addition of annotation data and/or the deletion of annotation data in connection with displayed data on a portable device.

The system 300 can further include a data store 302 that can include any suitable data related to the annotation component 102, and the annotated screen shot 104. For instance, the data store can include annotation data, collected annotation data, tracked annotation data, received data via the interface 106, audio, video, live-stream, graphics, handwriting, symbols, freestyle drawing, characters, lines, shapes, fonts, colors, sizes, voice, screen shots associated with a portable device, any suitable input received via an input associated with a portable device (e.g., mouse, stylus, touchpad, touch-screen, microphone, camera, video camera, digital camera, tablet, interactive screen, projector (e.g., on a wall, surface, etc.), display, etc. It is to be appreciated that the data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory. In addition, it is to be appreciated that the data store 302 can be a server, a database, a hard drive, and the like.

The following examples and/or scenarios are intended to provide context in comprehending the various situations and/or areas that the claimed subject matter can be employed. It is to be appreciated that the following examples and/or scenarios are not to be limiting on the subject innovation and that the system 300 can be utilized in a multitude of situations. In one example, a user can take a picture with a portable device and draw directly on such picture. A user can take a picture with any suitable device that includes a camera component and can add a comment, a mustache, glasses, etc. In another instance, when vacationing, the user can take a picture of the outside of a hotel and circle the room that the user is staying in. In still another example, the user can take a picture of a crowd of people and circle a particular person or group of people to distinguish them from others.

Furthermore, the subject innovation can be utilized in a medical field. A doctor, nurse, and/or any medical worker/assistant can take a picture of a particular piece of equipment, paperwork, etc. and highlight certain areas to communicate to other colleagues. For example, a nurse can take a picture of a piece of equipment monitoring a patient, wherein the nurse can highlight a particular portion of the monitor that is causing confusion. In another example, an email from a doctor can be annotated with particular data and sent to another colleague. Moreover, the subject innovation can be utilized to add voice annotation to displayed data on a portable device. In another example, a high score for a video game can be shared by highlighting such score and sending to another user. In addition, the claimed subject matter can be utilized with more complex applications where a user can document and/or log bugs in software and/or applications. For instance, if a user has problems setting up some service and gets stuck, the user can take a screen shot and identify the error (e.g., circle, arrows, box, highlight, etc.). Thus, upon communicating such error, the user can receive instructions and/or an explanation on correcting such issue.

In yet another example, a demo writer can tape a video of the screen interaction while it occurs. For instance, a parent can view their child write or draw a message and the parent can see/playback the strokes live. Furthermore, the user can save writing and a drawing. In another example, a video can be recorded and then replayed while a user can draw on such video in real-time (e.g., live). In still another example, a user can dynamically draw on a video while taping and/or recording such video. Taking another example, the user can make 3-dimensional (3-D) objects by stylus on screen shots taken.

Figure 4:
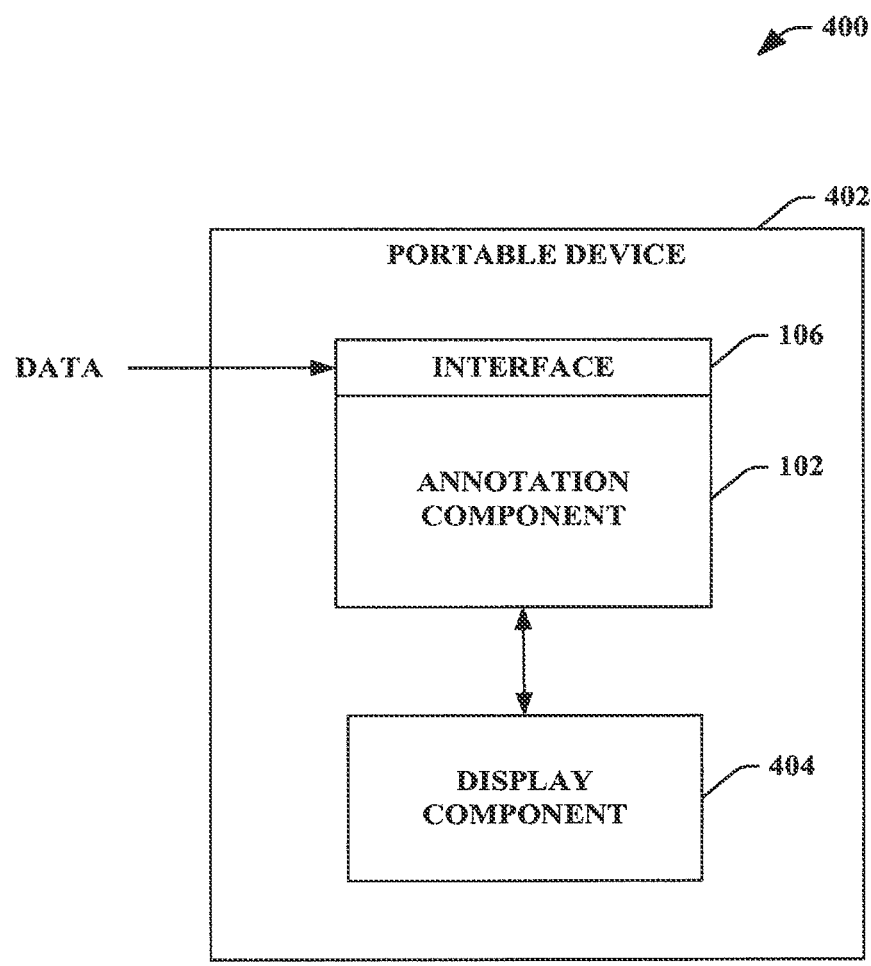
FIG. 4 illustrates a block diagram of an exemplary system that facilitates capturing data associated with a portable device to allow user specific annotation.

FIG. 4 illustrates a system 400 that facilitates capturing data associated with a portable device to allow user specific annotation. The system 400 can include a portable device 402 that can be, for instance, a mobile device, a cellular phone, a smart phone, a text messenger, a hand-held device, a mini-computer, a portable digital assistant (PDA), a hand-held computing device, a satellite radio, a satellite device, a global positioning system (GPS), a GPS device, a gaming device, a portable media device, mobile communication device, and/or any suitable portable device that can display data. The annotation component 102 can be integrated into the portable device 402, wherein the annotation component 102 can receive data via the interface 106. Such data received (e.g., also referred to as annotation data) can be any suitable data input received to annotate a screen shot captured by the annotation component 102. For example, the data received can be related to an input such as, but not limited to, mouse, stylus, touchpad, touch-screen, microphone, camera, video camera, digital camera, tablet, interactive screen, display, and the like.

The portable device 402 can further include a display component 404 that facilitates displaying data associated with the portable device 402. It is to be appreciated that the display component 404 can be any suitable display and/or screen such as, but not limited to, a monitor, a liquid crystal display (LCD), a plasma screen, a cathode ray tube (CRT) screen, a flat-screen, a television, a digital micro-mirror component, and/or any suitable component that can display data in portable device. The annotation component 102 can capture displayed data associated with the display component 404 and further capture annotation data to create an annotated screen shot. The annotation component 102 can capture the displayed data in a single snap shot, a plurality of snap shots, and/or a live-stream and/or video mode that captures the screen interaction in a continuous manner.

Figure 5:
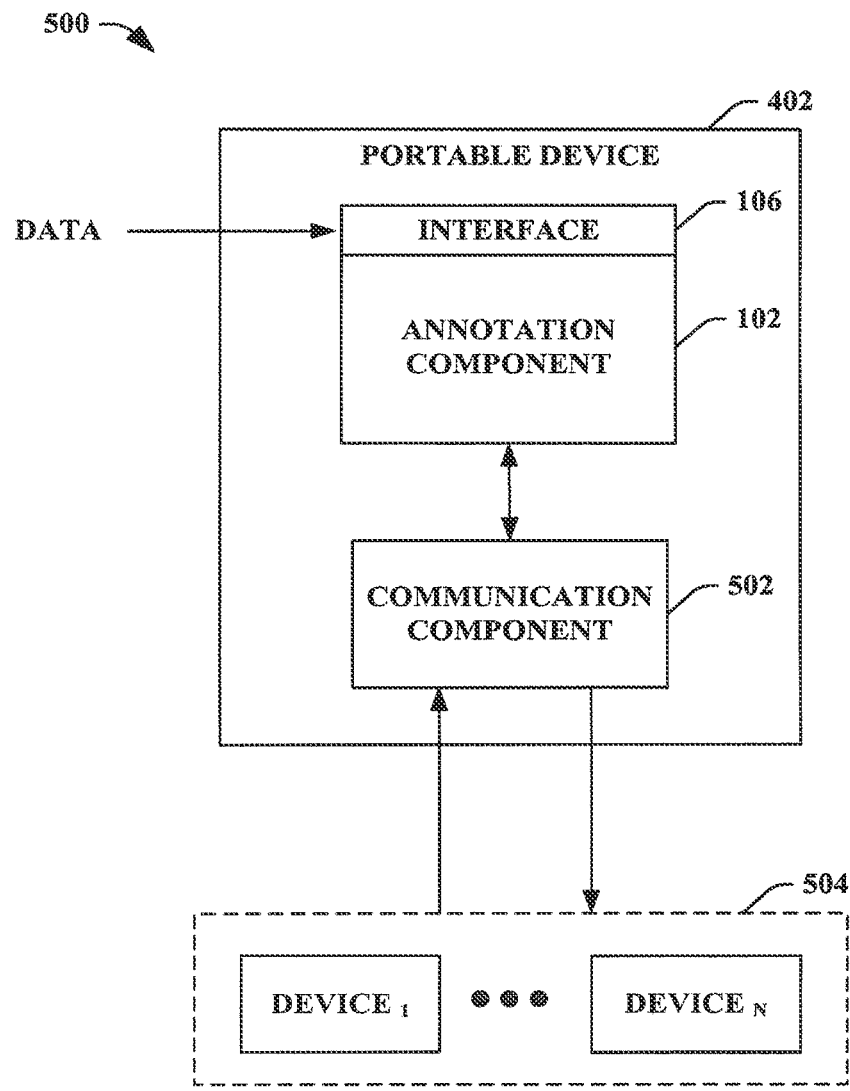
FIG. 5 illustrates a block diagram of an exemplary system that facilitates communicating portable device data and/or annotated data to a plurality of disparate devices.

FIG. 5 illustrates a system 500 that facilitates communicating portable device data and/or annotated data to a plurality of disparate devices. The system 500 can include the portable device 402 that can create an annotated screen shot utilizing the incorporated annotation component 102. The annotation component 102 can utilize a communication component 502 that transmits and/or receives data in accordance with the subject innovation. In particular, the communications component 502 can transmit the annotated screen shot (e.g., as discussed supra) to a disparate device 504. It is to be appreciated that there can be any suitable number of disparate devices 504 such as device $_1$ to device $_N$, where N is a positive integer. Moreover, it is to be appreciated that the device can be any suitable device and/or entity that can receive data such as, but not limited to, a computer, a laptop, a machine, a disparate portable device, a network, a server, a web site, an email address, a hard drive, a hand-held, a mobile device, a cellular phone, a smart phone, a text messenger, a mini-computer, a portable digital assistant (PDA), a hand-held computing device, a satellite radio, a satellite device, a global positioning system (GPS), a GPS device, a gaming device, a portable media device, mobile communication device, and/or any other suitable entity and/or device that can display and/or receive data.

For instance, a user can require action from several people in sales because sales in comparison to the target goal are in the red (e.g., not satisfied). When the user is on the road, the annotation can be utilized to capture a screen, written notes can be added to the screen shot and/or a voice can be added to ensure no mishaps with comprehending the user. Upon the user being complete with annotations, the annotated screen shot (e.g., including written and voice notes) can be communicated to various devices and thus, disparate users. In this example, the annotated screen shot can be transmitted to several people in sales in order to correct the sales issue.

The subject innovation can further be utilized out in the field (e.g., out of the office), wherein a qualified decision needs to be made. For instance, a problem with a fuse box can arise, wherein a determination whether a unit should be replaced or serviced needs to be made. The user in the field may not have a superior and/or any expertise on hand, thus the claimed subject matter can be utilized. A portable device can capture a picture of the fuse box, wherein ink notes can be added to the photos and/or voice comments can be added to the photos. The annotated screen shot(s) can then be transmitted to the appropriate personal in order to make an educated decision regarding the fuse box.

In another example, the subject innovation can be utilized in connection with placing goods in a proper manner according to marketing. A mobile sales assistant can be in a store, wherein marketing can inquire whether a product is placed correctly according to specific guidelines. The sales representative can utilize a portable device to capture the setup of the store. In addition, the pictures/images/video can be annotated with voice and/or ink comments. The annotated screen shots can be stored with the customer and/or in the backend. Further, the annotated screen shots can allow marketing to get a glimpse of the product placement.

Figure 6:
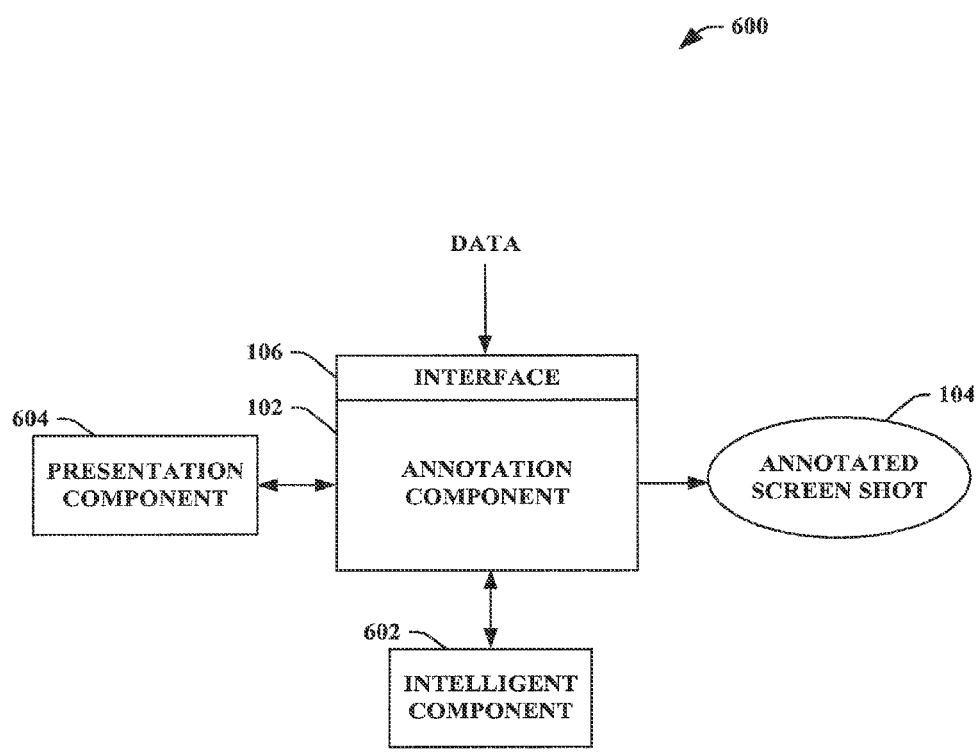
FIG. 6 illustrates a block diagram of an exemplary system that facilitates appending a screen shot associated with a portable device with annotated data.

FIG. 6 illustrates a system 600 that employs intelligence to facilitate appending a screen shot associated with a portable device with annotated data. The system 600 can include the annotation component 102, the annotated screen shot 104, and the interface 106, wherein it is to be appreciated that the annotation component 102, the annotated screen shot 104, and the interface 106 can be substantially similar to respective components, screen shots, and interfaces described in previous figures. The system 600 further includes an intelligent component 602. The intelligent component 602 can be utilized by the annotation component 102 to facilitate capturing and editing displayed data associated with a portable device. For example, the intelligent component 602 can infer annotation data, data input to collect annotation data, handwriting recognition, voice recognition, voice transcription, optimal annotation technique (e.g., audio, graphic, video, etc.), transmission techniques, transmission of annotated screen shot, recipient of annotated screen shot, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The annotation component 102 can further utilize a presentation component 604 that provides various types of user interfaces to facilitate interaction between a user and any component coupled to the annotation component 102. As depicted, the presentation component 604 is a separate entity that can be utilized with the annotation component 102. However, it is to be appreciated that the presentation component 604 and/or similar view components can be incorporated into the annotation component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the annotation component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
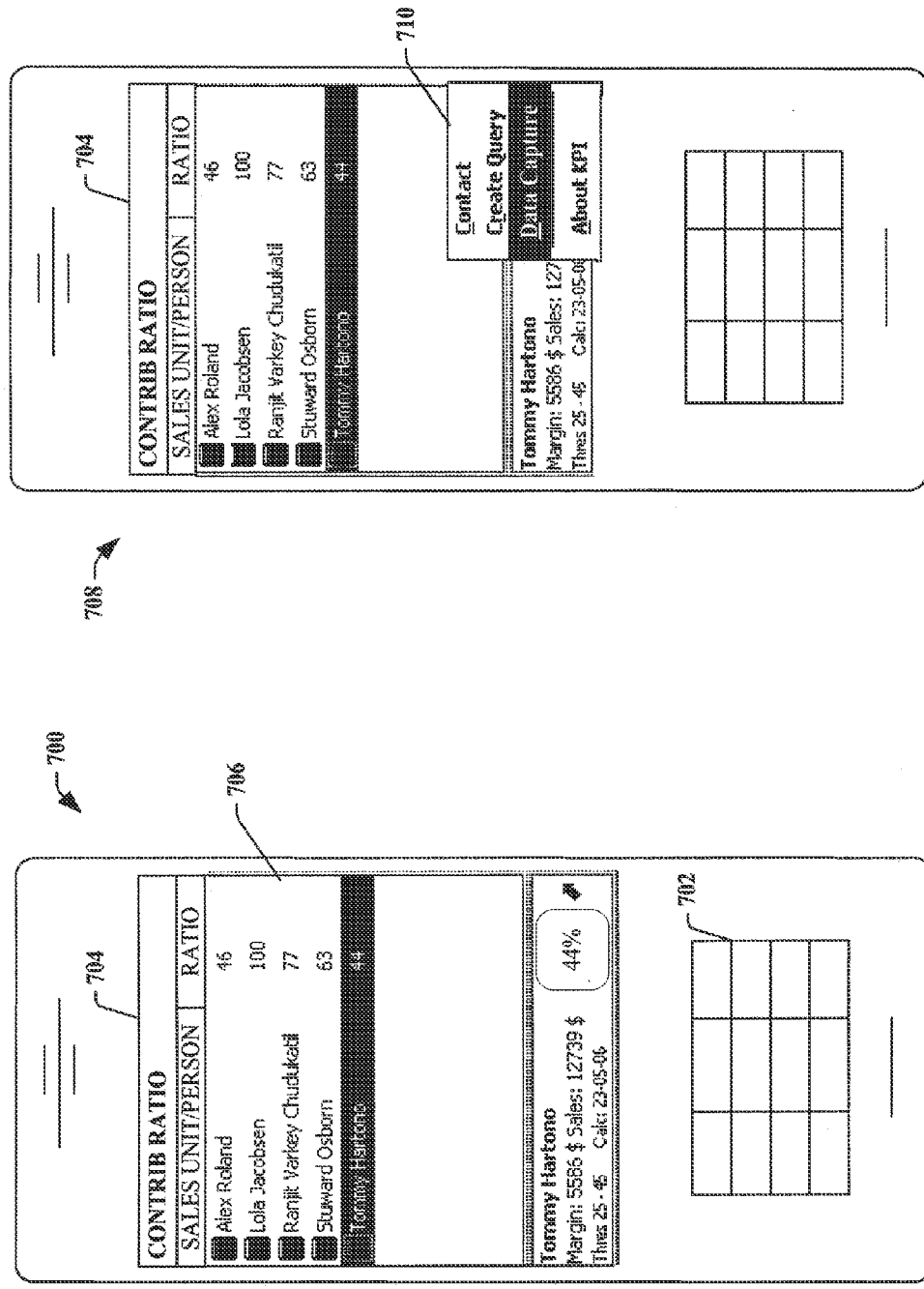
FIG. 7 illustrates a block diagram of an exemplary portable device that facilitates enabling the creation of an annotated screen shot.

FIG. 7 illustrates a portable device 700 that facilitates enabling the creation of an annotated screen shot. The portable device 700 can include an alpha-numeric keypad input 702 and a display 704. The alpha-numeric keypad input 702 can enable the entry of various letters, numbers, symbols, and the like in connection with data entry and/or manipulation of the portable device 700. Moreover, the portable device 702 can utilize the display 704 to depict displayed data 706 to a user and/or machine. The displayed data 706 can be any suitable data associated with the portable device 700 and it is to be appreciated that the subject innovation is not so limited to the data depicted in FIG. 7.

The displayed data 706 illustrates data related to contribution ratios (e.g., contrib ratio) for individuals and respective sales unit and ratios. The displayed data further illustrates the sales person "Tommy Hartono" highlighted with a more detailed view on the bottom portion of the display 704. In particular, "Tommy Hartono" has the lowest ratio in relation to sales contribution (e.g., 44%). In this particular example, having the lowest contribution ratio is not helping sales and requires some action.

FIG. 7 further illustrates a portable device 708 that can be substantially similar to portable device 700 other than disparate data is being displayed on the display 704. The portable device 708 can provide the initiation of a data capture feature in accordance with the subject innovation. For example, a window 710 can be initiated to execute data capture to allow for annotation data to be received. It is to be appreciated that the data capture can allow the receipt of at least one of audio data, video data, graphic data, etc. It is also to be appreciated that the depicted example relates to annotation data that is handwritten data utilizing at least one of a stylus, touch screen, tablet-screen, and the like. Moreover, the portable device 708 can track and/or collect annotation data for any suitable format such as audio annotation, voice annotation, video annotation, live-stream annotation, graphic annotation, graphic deletion annotation, etc. as illustrated and continued in FIG. 8.

Figure 8:
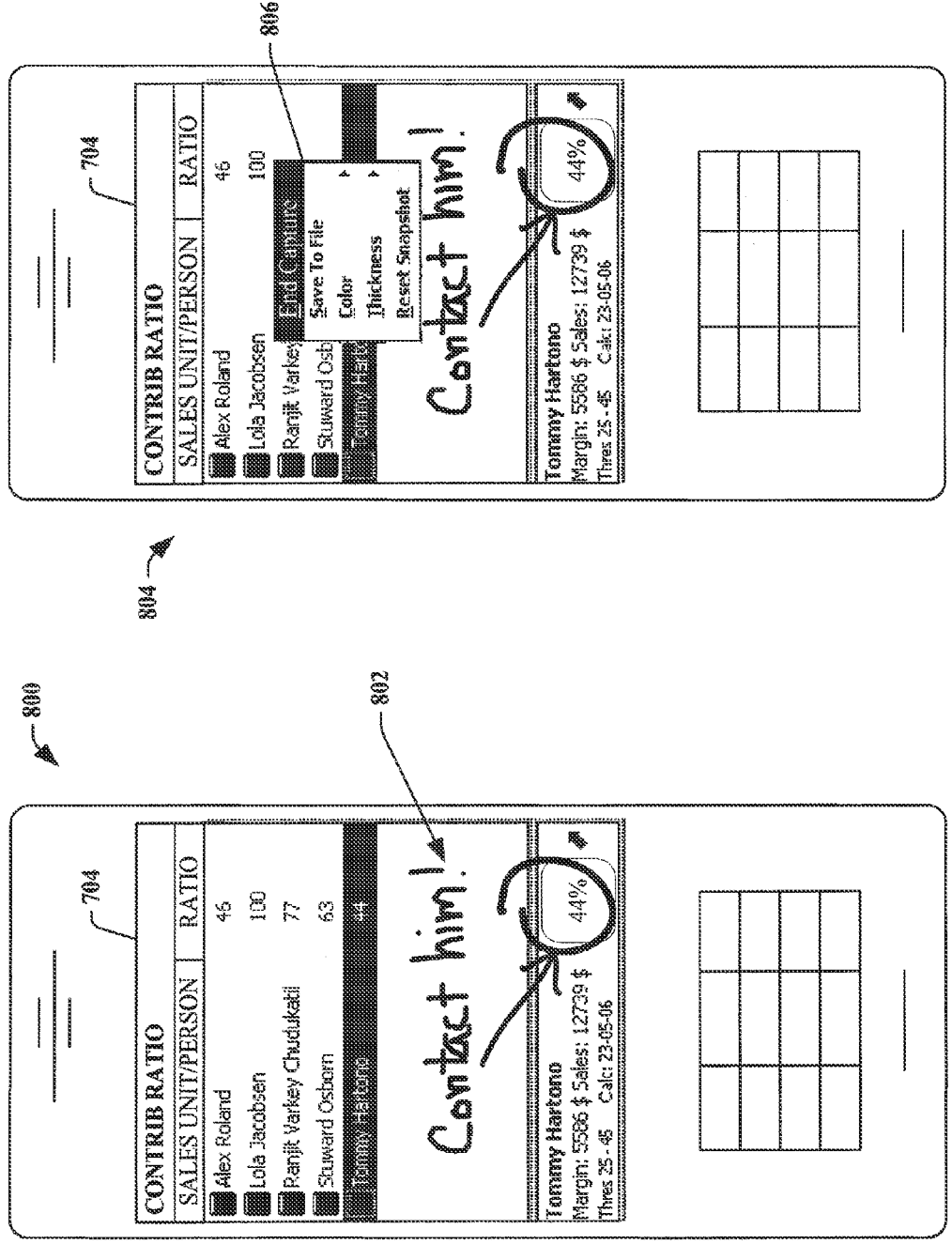
FIG. 8 illustrates a block diagram of an exemplary portable device that facilitates employing data capture to create an annotated screen shot that can be communicated and/or transmitted.

FIG. 8 illustrates a portable device 800 that facilitates employing data capture to create an annotated screen shot that can be communicated and/or transmitted. The portable device 800 can be substantially similar to the portable device 700 and 708 as depicted in FIG. 7 other than disparate data is displayed on the display 704. The portable device 800 can track and/or collect annotation data 802, wherein such annotation data in this example is handwritten data 802 that includes writing that states "Contact him!" and a respective arrow and circle. Such annotation data can emphasize particular details associated with the displayed data on the display 704. In this example, the user is emphasizing to contact "Tommy Hartono" based on the low contribution ratio associated therewith.

FIG. 8 further illustrates a portable device 804 that can be substantially similar to portable device 800 other than disparate data is being displayed on the display 704. The portable device 804 can conclude the data and/or annotation data capture. For example, a window 806 can end the capture, wherein the user can conclude the capturing of annotation data (e.g., regardless of format). In one example, the annotation data format can be selected prior to the initiation of the annotation data capture. In this particular example, however, the annotation data format (e.g., audio, video, graphic, etc.) can be selected after the conclusion of the data capture. Thus, the portable device 804 can track and/or collect any suitable data input for annotation such as audio, video, graphic, and the like (e.g., simultaneously and/or independently) and utilize at least one of such formats based at least in part upon a user's selection. Moreover, upon the selection of the specific annotation format, the portable device 804 can communicate and/or transmit such annotated screen shot to any other suitable device (e.g., described infra).

Figure 9:
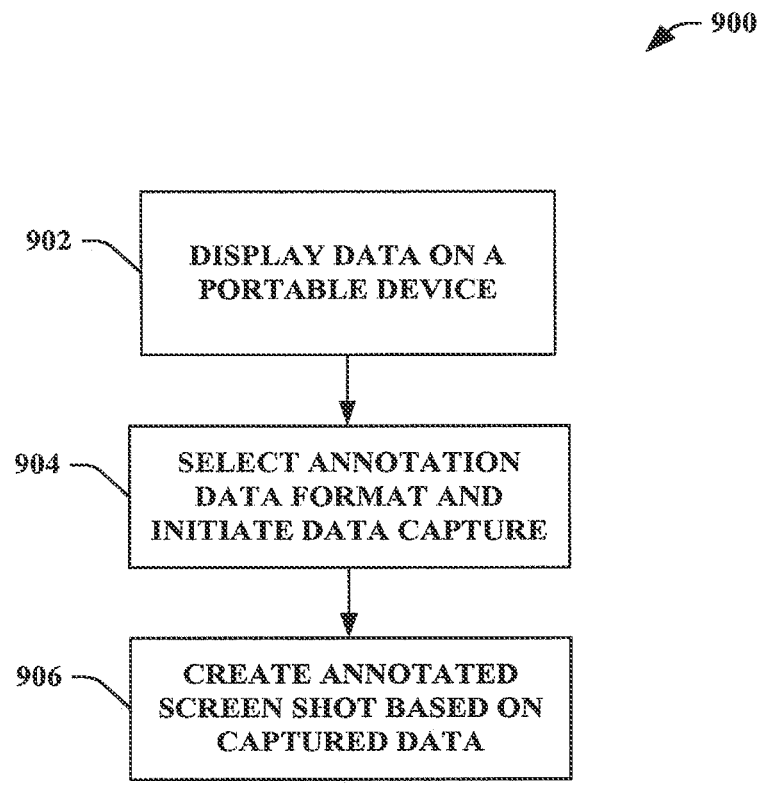
FIG. 9 illustrates an exemplary methodology for appending a screen shot associated with a portable device with annotated data.
Figure 10:
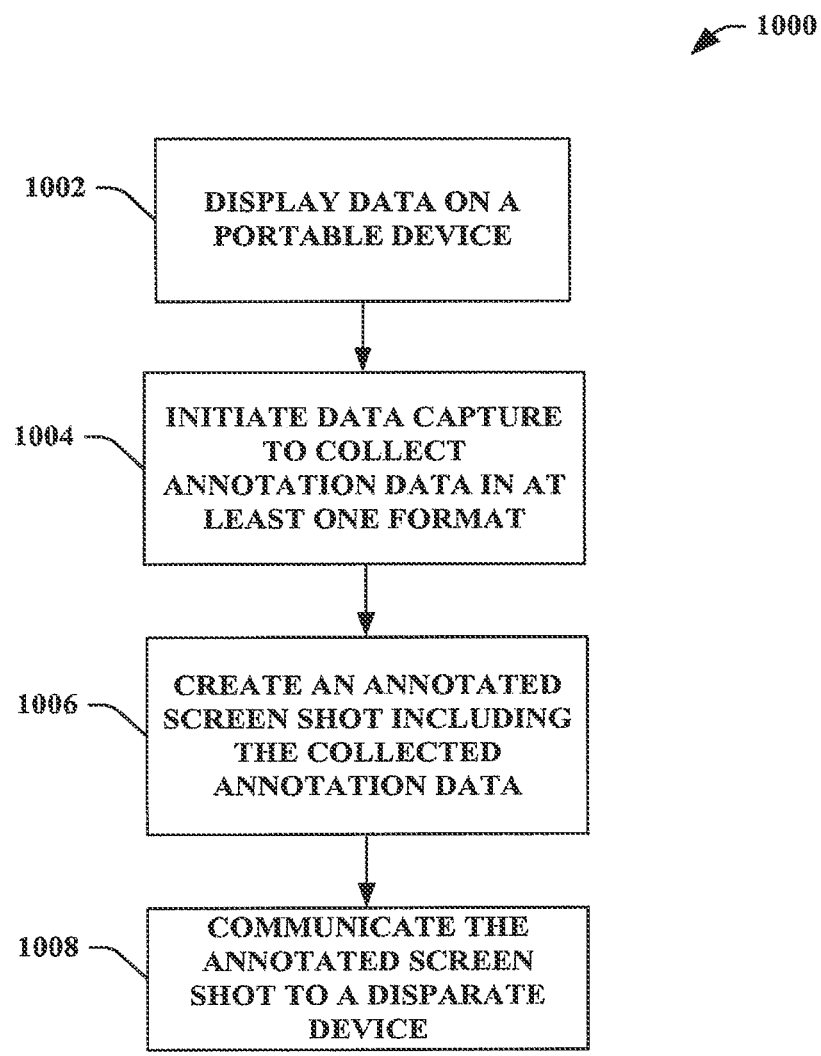
FIG. 10 illustrates an exemplary methodology that facilitates communicating portable device data and/or annotated data to a plurality of disparate devices.

FIGS. 9-10 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates a methodology 900 for appending a screen shot associated with a portable device with annotated data. At reference numeral 902, data can be displayed on a portable device, wherein such data can be any suitable data capable of being displayed on the portable device (e.g., graphical data, applications, operating system data, video data, software data, a portion of a graphic related to data, e.g.). It is to be appreciated that the data can be displayed on any suitable portable device such as, but not limited to, a mobile device, a cellular phone, a smart phone, a text messenger, a hand-held device, a mini-computer, a portable digital assistant (PDA), a hand-held computing device, a satellite radio, a satellite device, a global positioning system (GPS), a GPS device, a gaming device, a portable media device, mobile communication device, and/or any suitable portable device that can display data.

At reference numeral 904, an annotation data format can be selected and data capture can be initiated. The annotation data format can be selected, wherein the annotation data format can be audio, video, voice, live-stream, graphical additions, graphical subtractions, any other suitable combination thereof, etc. Upon the selection of a particular format for annotation data, the data capture can be initiated. For instance, an image can be displayed on a portable device, wherein a user can select annotating such image with handwritten graphical data (e.g., annotated data format is graphical addition). Upon the selection, the data capture can be initiated to allow the collection of such annotation data.

At reference numeral 906, an annotated screen shot can be created based at least in part upon the captured data. The captured annotated data can be appended to the displayed data (e.g., utilizing a screen shot and/or a collection of screen shots for a video/live-stream annotation) on the portable device to create the annotated screen shot. Thus, any data displayed on the portable device can be appended to allow user customization to convey a particular thought and/or detail associated therewith. Thus, if a particular file is displayed, a screen shot of such file can be captured and annotated data can be tracked to allow the creation of an annotated screen shot. In another instance, the desktop of the portable device can be captured via a snap shot, wherein the desktop can be appended with captured annotation data such as audio, video, graphics, and/or any combination thereof.

FIG. 10 illustrates a methodology 1000 that facilitates communicating portable device data and/or annotated data to a plurality of disparate devices. At reference numeral 1002, data can be displayed on a portable device. The portable device can be any suitable portable device that can display data, wherein the portable device can be, but is not limited to, a mobile device, a cellular phone, a smartphone, a text messenger, a hand-held device, a mini-computer, a portable digital assistant (PDA), a hand-held computing device, a satellite radio, a satellite device, a global positioning system (GPS), a GPS device, a gaming device, a portable media device, mobile communication device, and/or any suitable portable device that can display data.

At reference numeral 1004, data capture can be initiated to collect annotation data in at least one format. For instance, the data format can be, but is not limited to being, audio, video, graphic, voice, live-stream, graphic deletion, displayed data deletion, etc. in other words, the data capture can collect annotation data related to the displayed data, wherein such annotation data can be appended thereto. At reference numeral 1006, an annotated screen shot including the collected annotation data can be created. The annotated screen shot can be created by capturing a screen shot associated with displayed data and appending such screen shot with annotation data such as, but not limited to, audio, video, graphics, and/or any combination thereof. Moreover, it is to be appreciated that the deletion of data can be included as collected annotation data in order to create the annotated screen shot. In general, the addition of annotation data (e.g., and/or deletion of data) to any data displayed (e.g., application data, files, thumbnails, email, word processing documents, electronic files, images, pictures, video, audio clips, operating system data, any suitable data displayed on a portable device, etc.) can be employed by creating the annotated screen shot.

At reference numeral 1008, the annotated screen shot can be communicated to a disparate device. It is to be appreciated that the annotated screen shot can be transmitted to a disparate device utilizing any suitable technique (e.g., email, data transfer, etc.), wherein the disparate device can be any suitable device and/or entity that can receive data such as, but not limited to, a computer, a laptop, a machine, a disparate portable device, a network, a server, a web site, an email address, a hard drive, a hand-held, a mobile device, a cellular phone, a smartphone, a text messenger, a mini-computer, a portable digital assistant (PDA), a hand-held computing device, a satellite radio, a satellite device, a global positioning system (GPS), a GPS device, a gaming device, a portable media device, mobile communication device, and/or any other suitable entity and/or device that can display and/or receive data.

Figure 11:
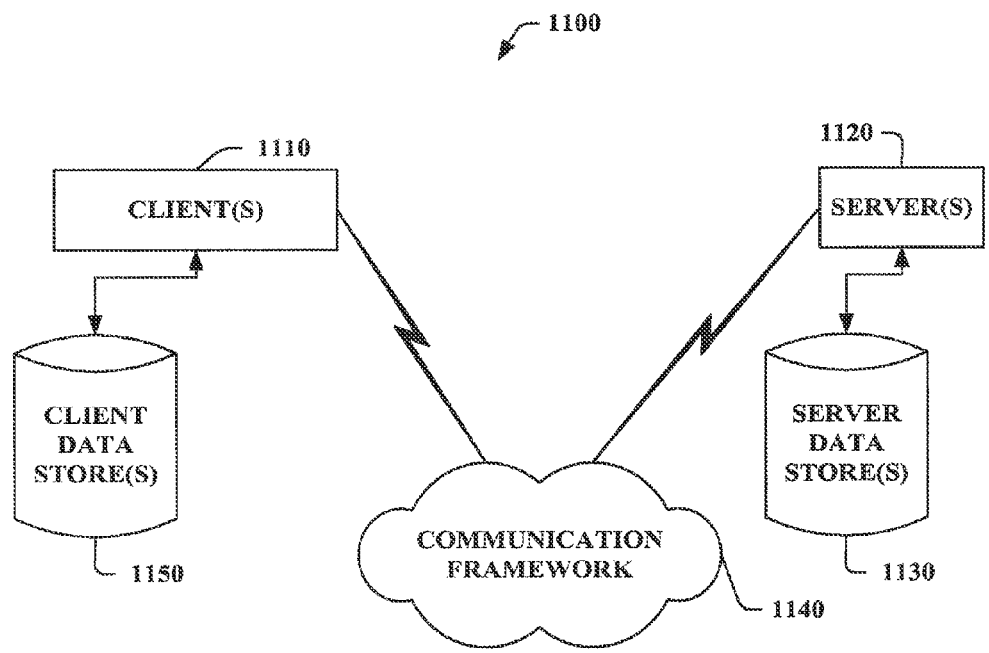
FIG. 11 illustrates an exemplary networking environment, wherein the novel aspects of the claimed subject matter can be employed.
Figure 12:
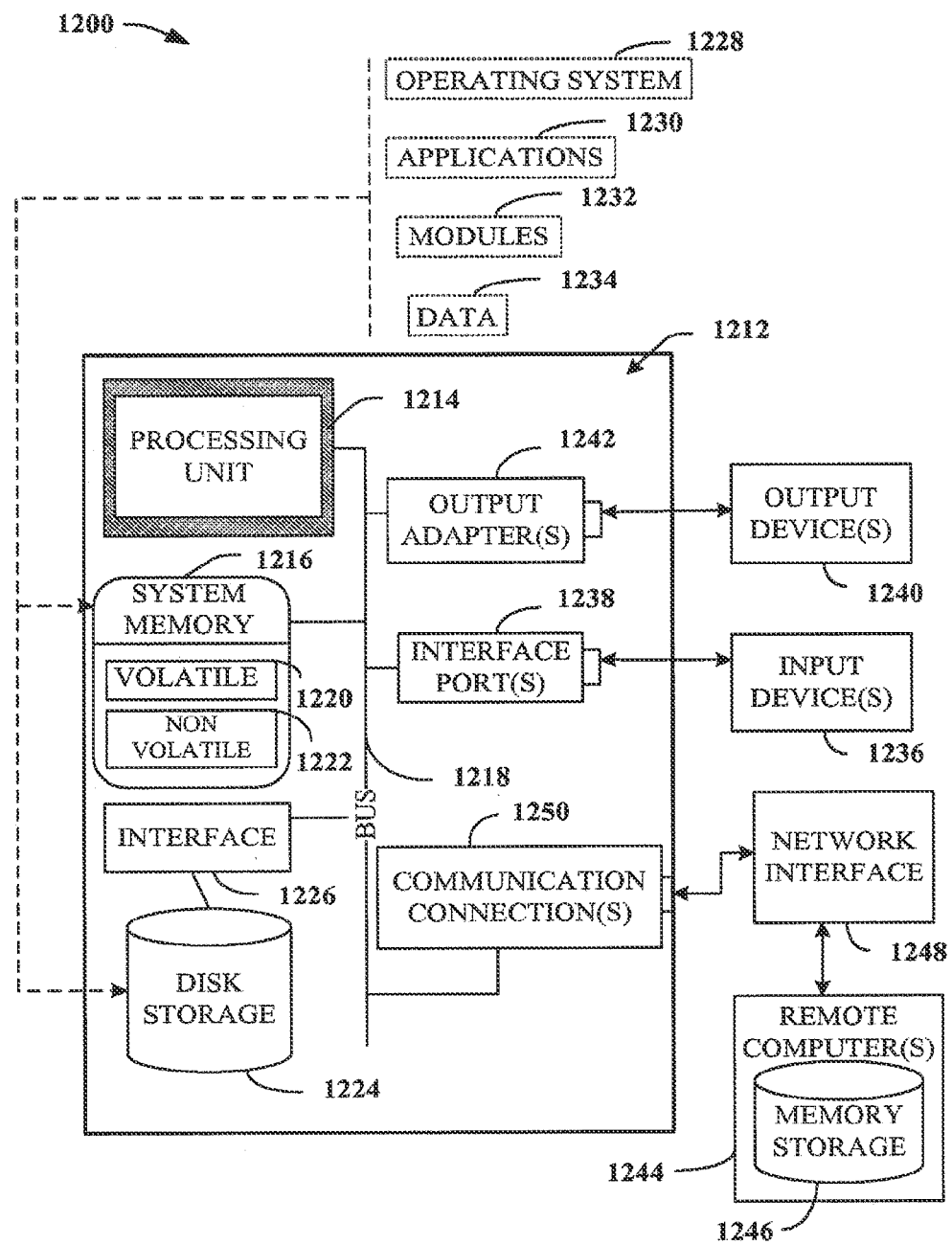
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, an annotation component that facilitates employing data capture that appends a screen shot associated with a portable device, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packer switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising.".

We claim:

1. A system that facilitates communicating data utilizing a portable device having a display screen and a memory containing content currently displayed on the display screen, comprising:
a memory storing computer-executable instructions of:
a display component that displays current content on the display screen;
an interface component that
receives from a user of the portable device an indication to annotate the current content of the display screen; and
after receiving the indication to annotate, receives annotation data related to current content of the display screen; and
an annotation component that creates an annotated screen shot of the display screen by:
performing a screen capture to collect from the memory a screen shot of current content of the display screen; and
appending the annotation data to the screen shot.

2. The system of claim 1 wherein the annotation data is at least one of the following: audio data, video data, an addition of a graphic, and a deletion of a graphic.

3. The system of claim 1 wherein the annotation data is data handwritten on the display screen and the annotation component collects a screen shot that includes the handwritten data.

4. The system of claim 3 wherein the indication to annotate is an indication to start collecting handwritten data and the interface component further receives an indication to stop collecting handwritten data.

5. The system of claim 1 wherein the annotation component captures a plurality of screen shots relating to at least one of video data and live-stream data.

6. The system of claim 1 wherein the current content of the display screen is generated by a gaming application.

7. The system of claim 1 wherein the annotation data includes handwritten data and voice data.

8. The system of claim 1 further comprising a component that transmits the annotated screen shot to other devices.

9. The system of claim 1 wherein the annotation data is received from an intelligent component that infers the annotation data.

10. The system of claim 9 wherein the inferred annotation data relates to context of the current content of the display screen.

11. A computer-implemented method that facilitates manipulating data associated with a device having a display screen, comprising:
displaying current content on the display screen of the device, the current content being stored in memory;
receiving annotation data relating to the current content that is displayed on the display screen; and
creating an annotated screen shot by
performing a screen capture to collect a screen shot of the displayed current content from the memory storing the current content; and
appending the annotation data to the collected screen shot to form the annotated screen shot.

12. The method of claim 11 wherein the annotation data is provided in a format relating to at least one of audio data, voice data, video data, live-stream data, an addition of a graphic, a deletion of a graphic, and an editing of the displayed data.

13. The method of claim 11 wherein the annotation data is data handwritten on the display screen and the screen capture collects a screen shot that includes the handwritten data.

14. The method of claim 11 wherein a plurality of screen captures are performed to collect a plurality of screen shots relating to at least one of video data and live-stream data.

15. The method of claim 11 wherein the annotation data includes handwritten data and voice data.

16. A computer-readable memory storing computer-executable instructions of a system that facilitates communicating data utilizing a device having a display screen, the computer-executable instructions comprising:

instructions that display current content on the display screen;

instructions that receive annotation data related to the current content of the display screen; and instructions that create an annotated screen shot corresponding to the current content of the display screen and the annotated data by performing a screen capture of the current content and appending the annotated data to the captured current content.

17. The computer-readable memory of claim 16 wherein the instructions that receive the annotation data receive from a user an indication to annotate the current content, receive from the user an indication of an annotation data format, and collect from the user annotation data in the annotation data format.

18. The computer-readable memory of claim 16 wherein the instructions that receive the annotation data receive data that is handwritten on the display screen.

19. The computer-readable memory of claim 18 wherein the annotation data includes voice data.

20. The computer-readable memory of claim 16 wherein the instructions that create an annotated screen perform a plurality of screen captures relating to at least one of video data and live-stream data.

\* \* \* \* \*